(12) United States Patent
Kalliokulju et al.

(10) Patent No.: US 6,717,928 B1
(45) Date of Patent: Apr. 6, 2004

(54) METHOD AND SYSTEM FOR CONTROLLING DATA TRANSMISSION WITH CONNECTION STATES

(75) Inventors: Juha Kalliokulju, Vesilahti (FI); Zhi-Chun Honkasalo, Kauniainen (FI)

(73) Assignee: Nokia Mobile Phones Ltd., Espoo (FI)

(*) Notice: Subject to any disclaimer, the term of this patent is extended or adjusted under 35 U.S.C. 154(b) by 0 days.

(21) Appl. No.: 09/283,940

(22) Filed: Apr. 1, 1999

(30) Foreign Application Priority Data

Apr. 2, 1998 (FI) .................................................. 980761

(51) Int. Cl.[7] .............................................. H04B 7/216
(52) U.S. Cl. ....................... 370/335; 370/338; 370/342; 370/352; 370/441; 370/450; 455/445; 455/466
(58) Field of Search ................................. 370/335, 338, 370/342, 349, 441, 320, 333, 352, 354, 450, 457, 469; 455/466, 445

(56) References Cited

U.S. PATENT DOCUMENTS

| 5,257,257 A | 10/1993 | Chen et al. ..................... 370/18 |
| 5,640,395 A | 6/1997 | Hamalainen et al. ........ 370/322 |
| 5,729,534 A | 3/1998 | Jokinen et al. .............. 370/280 |

(List continued on next page.)

FOREIGN PATENT DOCUMENTS

| EP | 0 615 364 A1 | 9/1994 | |
| WO | WO 97/15154 | 4/1997 | |
| WO | WO 97/37504 | * 10/1997 | .................. 455/426 |
| WO | WO 98/32304 | 7/1998 | |

OTHER PUBLICATIONS

"Digital cellular telecommunications system(Phase 2+)"; General Packet Radio Service (GPRS) Requirements specification of GPRS (GSM 01.60 version 6.0.0).

"Digital cellular telecommunications system(Phase 2+)"; General Packet Radio Service (GPRS); Service description: Stage 1 (GSM 02.60 version 5.2.0).

"Digital cellular telecommunications system(Phase 2+)"; General Packet Radio Service (GPRS); Service description; Stage 2 (GSM 03.60 version 5.2.0).

"Digital cellular telecommunications system(Phase 2+)"; General Packet Radio Service (GPRS); Mobile Station (MS)—Base Station System (BSS) interface; Radio Link Control/Medium Access Control (RLC/MAC) protocol (GSM 04.60 version 6.0.0).

Finnish Official Action and English translation thereof.

*Primary Examiner*—Dang Ton
*Assistant Examiner*—Inder Pal Mehra
(74) *Attorney, Agent, or Firm*—Perman & Green, LLP (57) ABSTRACT

The invention relates to a method in the packet switched data transmission between a wireless communication device (MS) and a packet network (PLMN1, PLMN2), in which data transmission between the wireless communication device (MS) and the packet network (PLMN1, PLMN2) is controlled with at least one packet switching controller (SGSN). A group of connection states is defined in the method, from said connection states one is selected at a given time, and the selected connection state is set to the wireless communication device (MS) and to the packet switching controller (SGSN). In addition, said connection states are defined in the method to be: a ready state (303), in which packets are transmissible in an activated data transmission connection, a standby state (302), in which data transmission connection packets to transmitted and received are waited for, and an idle state (301), in which the data transmission connection is deactivated. As a connection state also an extended ready state (304) is defined, to which a transition from the ready state (303) is conducted, and in which data transmission connection packets to be transmitted or received are waited for.

23 Claims, 4 Drawing Sheets

U.S. PATENT DOCUMENTS

| | | |
|---|---|---|
| 5,729,541 A | 3/1998 | Hamalainen et al. ........ 370/337 |
| 5,790,534 A | 8/1998 | Kokko et al. ................ 370/335 |
| 5,802,465 A | 9/1998 | Hamalainen et al. ........ 455/403 |
| 5,806,007 A | 9/1998 | Raith et al. ................. 455/574 |
| 5,887,262 A | 3/1999 | Willhoff ..................... 455/452 |
| 5,995,496 A * | 11/1999 | Honkasalo et al. |
| 6,233,458 B1 * | 5/2001 | Haumont et al. |
| 6,243,579 B1 * | 6/2001 | Kari |

* cited by examiner

METHOD AND SYSTEM FOR CONTROLLING DATA TRANSMISSION WITH CONNECTION STATES

BACKGROUND OF THE INVENTION

1. Field of the Invention

The present invention relates to a method according to the preamble of the appended claim 1 for setting up a connection state in a packet network, to a system according to the preamble of the appended claim 11, and to a wireless communication device according to the preamble of the appended claim 23.

2. Brief Description of Earlier Developments

Figure 1:
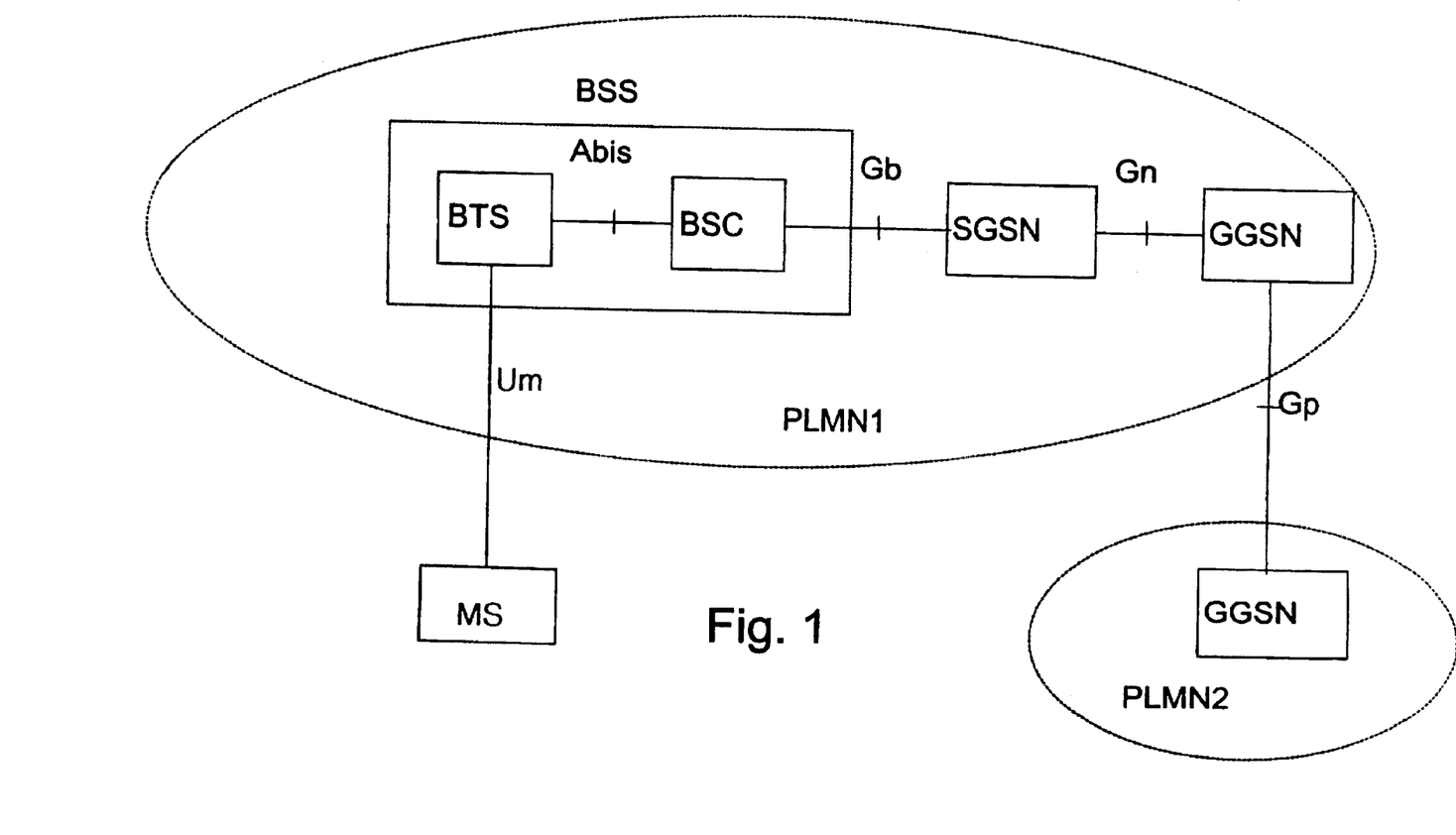
FIG. 1 shows the logical structure of a GPRS system in a reduced block diagram.

Data transmission between different devices can be established in such a way that those communication devices between which data is to be transmitted at a given time, are connected for a time required in the data transmission. Thus, this so-called circuit-switched connection is effective until the user terminates the data transmission. In such cases, most of the communication time is passed feeding the commands given by the user and only a small share of the time is used for the actual data transmission. This restricts, for instance, the maximum number of simultaneous users of the same application. Another alternative is to utilize so-called packet switched data transmission. Thus, data is transmitted between communication devices in a packet format, wherein the time between packets is free to be used by other communication devices. Thus, the number of simultaneous users can be increased, especially in wireless data transmission networks, such as cellular networks, because then the wireless communication devices in the area of the same cell can use the same transmission channel. One cellular system is the GSM system (Global System for Mobile Communication), for which a packet format data transmission service GPRS (General Packet Radio Service) is developed. FIG. 1 presents in a block diagram the blocks essential for the operation of the GPRS system. A packet switching controller SGSN (Serving GPRS Support Node) controls the operation of the packet switching service on the cellular network side. The packet switching controller SGSN attends to the logging in and out of a wireless communication device MS, updating the location of the wireless communication device MS, and directing the data packets to right addresses. The wireless communication device MS is connected to a base station subsystem BSS via a radio interface Um (FIG. 1). The base station subsystem is connected to the packet switching controller SGSN through a BSS-SGSN interface Gb. In the base station subsystem BSS, a base station BTS and a base station controller BSC are connected with each other with a BTS-BSC interface Abis. The packet switching controllers SGSN can communicate with other packet switching controllers SGSN by means of a gateway GPRS support node (GGSN). The GPRS system is described, for example, in the draft proposals GSM 01.60, GSM 02.60, GSM 03.60 and GSM 04.60.

Figure 2:
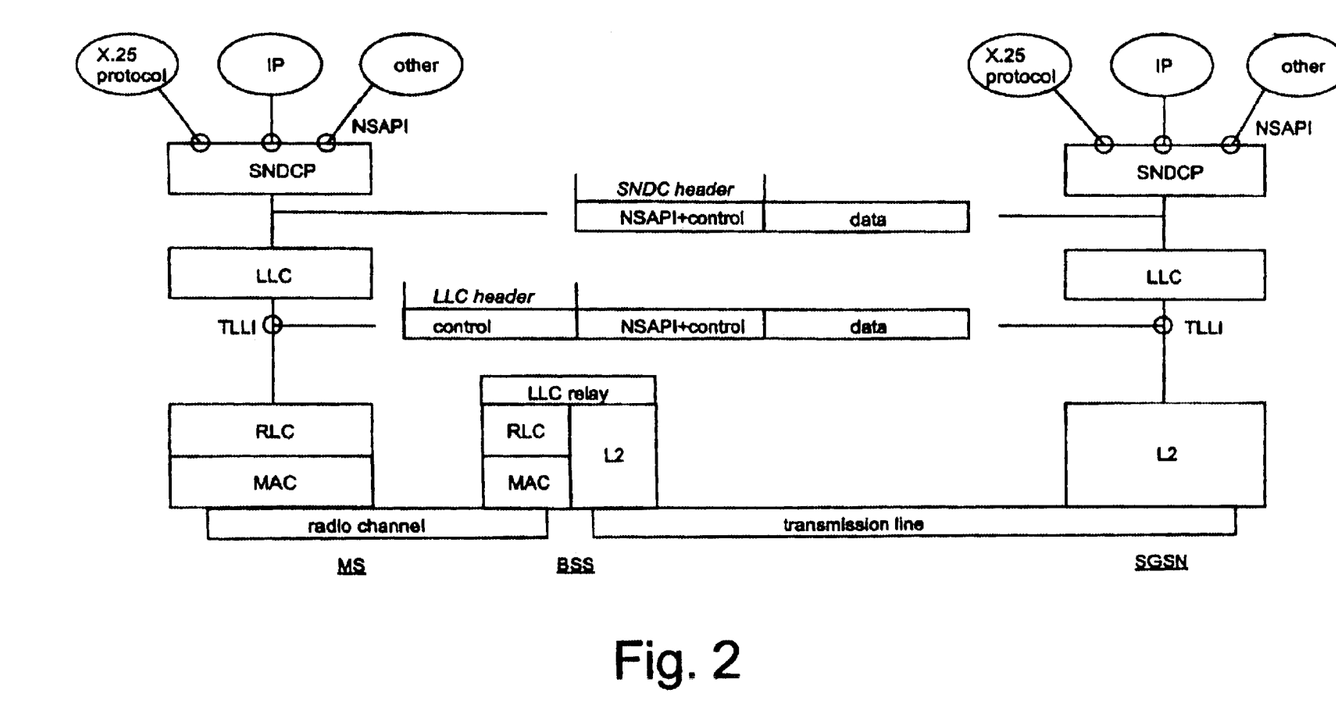
FIG. 2 shows the layer structure of the GPRS system and the data frame structure of the layers.

It is possible to divide the operation of both the wireless communication device MS and the packet switching controller SGSN into several layers, each having a different function, as presented in FIG. 2. The International Standardisation Organisation ISO has developed an OSI model (Open Systems Interconnection) for grouping data transmission into different functional layers. This model contains seven layers which are not necessarily needed in all telecommunication systems. The layers are, listed from top to bottom: an application layer, a presentation layer, a session layer, a transport layer, a network layer, a data link layer, and a physical layer.

The transmission of the information to be transferred, such as control signalling and data transmitted by the user, between the wireless communication device MS and the packet switching controller SGSN is advantageously performed in the form of data frames. The data frame of each layer consists of a header field and a data field. FIG. 2 also presents the structure of the data frames used in the GPRS system in different layers.

The information contained in the data field can be, for example, information entered by the user of the wireless communication device, or signalling data. In the following, the functions of the layers of the GPRS system will be presented.

In the data link layer the lowermost layer is a MAC layer (Media Access Control), which attends to using the radio channel in communication between the wireless communication device MS and the base station subsystem BSS, e.g. reserving channels in the transmission and reception of packets.

The data transmission between the base station subsystem BSS and the packet switching controller SGSN in the lowermost layer is conducted in the L2 layer (data link layer), using a data link layer protocol, such as the LAPD protocol according to the standard Q.921, a frame relay protocol, or the like. The L2 layer can also contain quality and routing data according to GPRS definitions. The L2 layer contains features of the physical layer and the data link layer of the OSI model.

Above the MAC layer, there is a RLC layer (Radio Link Control) for the purpose of dividing the data frames established by the LLC layer into packets of fixed size, transmissible on the radio channel (PDU, Protocol Data Unit), and transmitting and retransmitting them if necessary. The length of the packets in the GPRS system is the length of one GSM time slot (c. 0.577 ms).

The LLC layer (Logical Link Control) provides a reliable data transmission link between the wireless communication device MS and the packet switching controller SGSN. The LLC layer, for example, adds debugging data to the message to be transmitted, whereby it is possible to aim to correct incorrectly received messages and, if necessary, the message can be retransmitted. In addition, data encryption and decryption is conducted in the LLC layer.

Protocol modifications, compression, and segmentation of the data to be transmitted, and segmentation of the messages transmitted from an upper layer are performed in a SNDCP layer (Sub-Network Dependent Convergence Protocol). The structure of the SNDCP layer is also presented in FIG. 2. The SNDCP frame comprises a SNDCP header field and a SNDCP data field. The SNDCP header field consists of protocol data (Network Service Access Point Identity, NSAPI) and SNDCP control data, such as compression, segmentation and encoding definitions. The SNDCP layer functions as a protocol adapter between the protocols used in the upper layer and the protocol of the LLC layer (data link layer).

The information to be transmitted enters the SNDCP layer from an application advantageously in data packets according to a protocol (PDP, Packet Data Protocol), such as messages according to the X.25 protocol or packets of the Internet protocol (IP). The application can be, for example, a data application of a wireless communication device, a telecopier application, a computer program which communicates with a wireless communication device, etc.

The MAC layer, the RLC layer, the LLC layer, and the L2 layer contain features which are described in layer 2 in the OSI model. The aforementioned layers and the layers described in the OSI model are not, however, distinctly consistent.

The SNDCP frame is transferred to the LLC layer, in which an LLC header field is added to the frame. The LLC header field consists, for instance, of an LLC control element which defines the number of the frame and the type of the command (info, acknowledgement, request for retransmission, etc.). In connection with the login to the GPRS packet network, the wireless communication device sends an inlog request message to the packet switching controller SGSN. The packet switching controller SGSN can, on the basis of a wireless communication device identification IMSI (International Mobile Station Identity) retrieve information from the home location register HLR corresponding to the wireless communication device in question, wherein the packet switching controller SGSN can, on the basis of this data, select a temporary logical link identity TLLI for the data transmission connection. If the wireless communication device has previously had a TLLI identification in its use, the wireless communication device transmits this in the request message, wherein the packet switching controller SGSN can place this identification again at the disposal of the wireless communication device, or allocate a new TLLI identification. The packet switching controller SGSN transmits the selected TLLI identification to the wireless communication device to be used in the data transmission between the wireless communication device and the packet switching controller SGSN. This TLLI identification is used in the data transmission to define which data transmission connection the message in question belongs to. The same TLLI identification is allowed to be used in only one data transmission connection at a time. After the connection is terminated, the TLLI identification used in the connection can be allocated to a new connection which is being set up. This is described in more detail in the GSM standard 03.60.

The cells included in the packet network are divided by the operator of the packet network into routing areas, which can be used to define the location of the wireless communication device MS. Each routing area comprises one or more cells. Thus, with a mobility management function of the wireless communication device, the aim is to maintain information on the location and connection state of the wireless communication devices in the operating range of the packet network. This information is maintained both in the wireless communication device and in the packet network, advantageously in the GPRS support node SGSN. In the GSM system, the base station connected to the wireless communication device MS is changed when the cell is changed. In CDMA based (Code Division Multiple Access) cellular networks, the wireless communication device MS can be communicated simultaneously via several base stations. The base stations transmit a spread spectrum signal on a so-called pilot channel, wherein the wireless communication device can, on the basis of these pilot signals, conclude which base station has the most advantageous signal with respect to communication. Those base stations which are communicating with the wireless communication device MS at a given time, compose a so-called active set. The movement of the wireless communication device by means of the packet network of the CDMA system can be concluded from the alteration of these active sets.

In the GPRS system currently in use, the wireless communication device can have three different connection states in respect of the packet network: an idle state, a standby state and a ready state. In the idle state, the wireless communication device is not connected to the mobility management of the network, and communication is not possible. In the ready state, the wireless communication device is connected to the mobility management of the packet network, the location of the wireless communication device is known by the packet network with an accuracy of one cell, and the wireless communication device can both transmit and receive data packets. In the standby state, the wireless communication device is connected to the mobility management of the packet network, wherein the wireless communication device cannot either transmit or receive data packets, and the location of the wireless communication device is known by the packet network with an accuracy of the routing area only. The transition from the ready state to the standby state can be conducted, for instance, when a sufficiently long time has passed since the latest data packet was transmitted between the wireless communication device and the packet network. This time is measured advantageously with a ready counter.

When the wireless communication device is moved, its location and status is updated with signalling messages transmitted in the packet network. The wireless communication device is not, however, always in motion, but is, for example, in an office during a working day. Thus, the updating signalling for the location of the wireless communication device exerts an unnecessary load on the packet network and increases the power consumption of the wireless communication device. In addition, the transition from the standby state to the ready state requires paging signalling before packets can be transmitted between the wireless communication device and the packet network, which delays data transmission.

SUMMARY OF THE INVENTION

One purpose of the present invention is to provide a method for setting up a connection state in the packet network, a system applying the method and a wireless communication device which can be used in it. The present invention is characterized in what will be presented in the characterizing part of the appended claim 1. The system according to the present invention is characterized in what will be presented in the characterizing part of the appended claim 11. The wireless communication device according to the present invention is further characterized in what will be presented in the characterizing part of the appended claim 23. The invention is based on the idea that the packet network is supplemented with a connection state, an extended ready state, in which it is possible to set the wireless communication device connected to the packet network, especially when its location remains substantially unaltered and when the wireless communication device has no data packets to transmit or receive.

Considerable advantages are achieved with the present invention compared with methods, packet networks and wireless communication devices of prior art. With the extended active state according to the invention, loading of the packet network can be decreased, because the need for signalling is reduced when the wireless communication device is immobile. The reduced need for signalling also reduces the power consumption of the wireless communication device, thereby extending the standby time of the wireless communication device with one charging. In addition, data transmission is accelerated in situations when there has been a pause in the transmission of data packets, after which a new transmission is begun.

BRIEF DESCRIPTION OF THE DRAWINGS

In the following, the invention will be described in more detail with reference to the appended figures, in which.

DETAILED DESCRIPTION OF THE PREFERRED EMBODIMENT

In the following, the invention will be illustrated by means of a packet switching service GPRS implemented in the GSM system, but the invention is not, however, solely restricted to this system. It is possible to apply the invention, for example, in a UMTS system under development and in other third generation mobile communication systems, merely by changing the radio protocol of the lowermost layer.

The connection between a wireless communication device MS and a packet switching controller SGSN may have different operation modes, such as a point-to-point connection (PTP), a point-to-multipoint-multicast connection (PTM-M), point-to-multipoint-group (PTM-G), etc. A separate identification is allocated for each connection type between the wireless communication device MS and the packet switching controller SGSN. According to current standards, the following different types are available in the GPRS system:

- Point-to-point connection (PTP) uses an individual TLLI identification in communication between the wireless communication device MS and the packet switching controller SGSN.
- Point-to-multipoint-multicast integrated service (PTM-M) uses an IMGI identification (International Mobile Group Identity) reserved for communication between the wireless communication device MS and an integrated service center.
- Point-to-multipoint-group (PTM-G) uses, inside a group of wireless communication devices, an IMGI identification reserved for communication between wireless communication devices MS.

The point-to-point connection typically uses an acknowledgement mode in the data link layer, i.e. the receiver of the transmission transmits as an acknowledgement information that the reception was successful. In point-to-multipoint-multicast connections, the data frames are usually transmitted in an operation mode, in which acknowledgements are not transmitted. The GSM standard 02.60 describes these various connection modes in more detail.

The mobility management (MM) of the packet network refers, in this context, to the mobility management functions and connection states conducted on the basis of the wireless communication device identification IMSI (International Mobile Station Identity) of the packet network user and the temporary logical link identity TLLI. However, the number of the packet switching connections and their status do not affect the mobility management.

Figure 3:
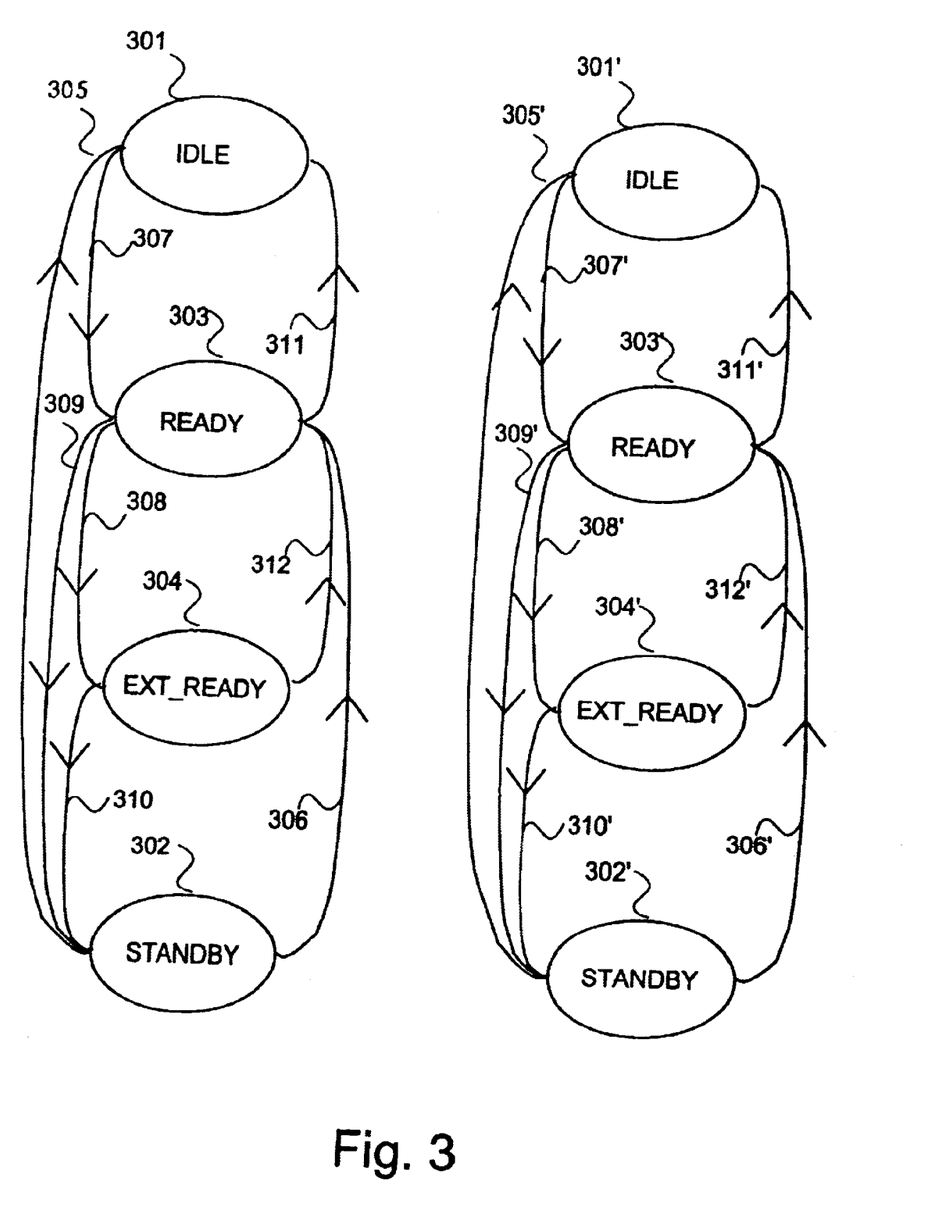
FIG. 3 shows a state transition diagram of the mobility management connection states according to an advantageous embodiment of the invention.

In the following, the various connection states will be described in more detail with reference to the state transition diagram of the appended FIG. 3. The state transition diagram presents the connection states of both the wireless communication device MS and the packet switching controller SGSN, and the transitions between the connection states.

The reference numerals containing an apostrophe (') refer to the state transition diagram of the packet switching controller SGSN.

In an idle state, the wireless communication device MS is not connected to the packet network, wherein paging signalling is not conducted. The mobility management data of the wireless communication device MS and the mobility management data of the packet switching controller SGSN for the part of the wireless communication device MS, is not necessarily up to date, if the wireless communication device has moved into the area of another cell while in the idle state. The wireless communication device MS selects and reselects, if necessary, a cell in the public land mobile network (PLMN) and in the packet network. In the idle state the wireless communication device MS can receive point-to-multipoint-multicast (PTM-M) integrated service transmissions. However, data transmission in the point-to point connection (PTP) and in the point-to-multipoint-group (PTM-G) is not possible. The wireless communication device MS in the idle state is, with respect to the packet network, unconnected to the network. For updating the mobility management data of the wireless communication device MS and the packet switching controller SGSN, an attach procedure to the packet network has to be conducted from the wireless communication device MS. The block illustrating the idle state is marked with the reference number 301 in FIG. 3.

In a standby state (block 302), the wireless communication device MS is connected to the mobility management of the packet network. The mobility management data is updated on the basis of a wireless communication device identification IMSI. The wireless communication device MS can receive both point-to-multipoint-multicast integrated service packets and point-to-multipoint-multicast group packets. The reception of the paging request for the data transmission of the point-to-point connection and point-to-multipoint-group connection is possible. Furthermore, it is possible to receive paging requests from the packet switching controller for cell selection services (CS). Nevertheless, transmitting and receiving point-to-point connection packets and transmitting point-to-multipoint-group packets is not possible in the standby state. The wireless communication device MS performs the selection of the routing area and the cell locally and announces with the mobility management functions to the packet switching controller SGSN, if the wireless communication device MS has changed the routing area. The wireless communication device MS does not report the packet switching controller SGSN if the cell has changed, wherein the packet switching controller SGSN does not necessarily contain updated information on the location of the wireless communication device MS.

The wireless communication device MS which is in the standby state can start the activation or deactivation of a packet connection (PDP). The status of the packet connection has to be updated before transmitting and receiving data packets. If the packet connection is activated, the packet switching controller SGSN can receive packets of point-to-point connection and point-to-multipoint-group. Thus, the packet switching controller SGSN transmits a paging request to the routing area in which the wireless communication device MS is located. When the wireless communication device MS transmits a reply message to this request, the connection state of the wireless communication device MS is changed to the ready state (state 303). The connection state of the packet switching controller SGSN is changed to the ready state after it has received a reply message to the paging request from the wireless communication device MS. In the wireless communication device MS, the transition from the standby state to the ready state is conducted also in a situation where the wireless communication device transmits data packets or signalling data to the packet switching controller SGSN. Correspondingly, in the packet switching controller SGSN, the transition from the standby state to the ready state is conducted also in a situation where the packet switching controller SGSN receives data packets or signalling data transmitted by the wireless communication device MS.

The wireless communication device MS can start disconnecting from the packet network and transfer to the idle state (arrow 311). This can be started, for instance, in a situation where a standby counter reaches a preset calculatory value, e.g. is reset to zero. The mobility management data in the wireless communication device MS and in the packet switching controller SGSN for the part of the wireless communication device MS in question can be removed.

In an extended ready state 304 (EXT_READY) according to the invention, the wireless station MS is coupled to the mobility management of the packet network, and both the wireless communication device MS and the packet switching controller SGSN contain updated mobility management data. The packet network does not conduct paging signalling when the wireless communication device MS and the packet switching controller SGSN are in this extended ready state. The wireless communication device MS can receive point-to-multipoint-multicast integrated service packets and point-to-multipoint-group packets.

In the extended ready state, the mobility management data of the packet switching controller SGSN corresponds to the mobility management data of the standby state supplemented with information on the location cell of the wireless communication device MS. The wireless communication device MS does not, however, transmit data on the selected cell but it has been defined last time when the wireless communication device was in the ready state 303, the state from which a transition was made to the extended ready state 304. The selection of the packet network cell is conducted locally by the wireless communication device MS.

Regardless of whether there are radio resources (a radio channel) reserved for the wireless communication device MS in question at that moment, the connection state remains in the extended ready state 304, even though the wireless communication device MS did not have data packets to transmit or receive. The duration of the extended ready state is controlled with a counter. The connection state is changed from the extended ready state to the standby state when the extended ready state counter is running and the wireless communication device MS starts to move. Thus, the wireless communication device MS reports to the packet switching controller SGSN that it is conducting a force-to-standby function. The transition of the connection state from the extended ready state to the ready state takes place in the wireless communication device MS in a situation where the wireless communication device transmits data packets or signalling data to the packet switching controller SGSN. Correspondingly, the transition of the connection state from the extended ready state to the ready state is conducted in the packet switching controller SGSN in a situation where the packet switching controller SGSN receives data packets or signalling data transmitted by the wireless communication device MS.

In the extended ready state 304, the paging signalling is not conducted, whereby it is possible to reduce the power consumption of the wireless communication device. On the other hand, the location of the wireless communication device is known in the packet network with the accuracy of one cell, wherein transmitting and receiving packets does not require paging signalling, but the connection state can be changed into the ready state and the transmission of the packets can be started.

In the ready state 303 the mobility management data of the packet switching controller SGSN corresponds to the mobility management data of the standby state supplemented with data on the location cell of the wireless communication device MS. The wireless communication device MS conducts mobility management functions in order to announce to the packet network the cell selected at a given time. The selection and reselection of the packet network cell is either conducted by the wireless communication device MS, or the packet network can control the selection of the cell. The base station subsystem GPRS protocol (BSSGP) packet header transmitted by the wireless communication device MS contains the identification of the cell. The function of this base station subsystem GPRS protocol is, in a system according to the present packet network, to transmit information connected with routing and quality of service (QoS) between the base station subsystem BSS and the packet switching controller SGSN.

In the ready state, the wireless communication device MS can transmit and receive packets of point-to-point connection. When the wireless communication device MS moves, the packet network can perform paging signalling of the wireless communication device MS packet network. The signalling of other services is also possible via the packet switching controller SGSN. The packet switching controller SGSN transmits the packets to be transmitted to the wireless communication device MS to the base station subsystem BSS in whose area the wireless communication device MS is located at that moment.

In the ready state, the wireless communication device MS can receive point-to-multipoint-multicast integrated service packets and point-to-multipoint-group packets. In addition, the wireless communication device MS can activate and deactivate packet connections.

Regardless of whether there are radio resources reserved for the wireless communication device MS in question at that moment, the connection state remains in the ready state, even though the wireless communication device MS did not have data packets to transmit or receive. The duration of the ready state is monitored with a counter. The connection state changes from the ready state to the extended ready state when the ready counter reaches a preset calculatory value. The wireless communication device MS can be transferred from the ready state to the standby state by means of a force-to-standby function. The transfer from the ready state to the idle state is performed with a packet network disconnection function, which is activated by the wireless communication device MS.

In the following, the transition between different connection states is described with reference to the state transition diagrams in FIG. 3. The connection state to which the transition is made depends, for instance, on the connection state in which the wireless communication device MS and the packet switching controller SGSN are at the moment of the transition, and which event causes the transition, for example, connection to a packet network or packet network disconnection. The transition from the idle state 301 to the ready state 303 is performed at the stage of attachment of the wireless communication device MS to the packet network (GPRS attach). In connection with that, the wireless communication device MS requests for attachment to the packet network, and a logical link connection is initialized in the packet switching controller SGSN. Furthermore, in the wireless communication device MS and in the packet switching controller SGSN, a space is initialized in the storage means for maintaining mobility management data. This transition from the idle state 301 to the ready state 303 is presented in the state transition diagram of FIG. 3 with the arrow 307 for the part of the wireless communication device MS and with the arrow 307' for the part of the packet switching controller SGSN.

The transition from the standby state 302 to the idle state 301 (arrow 305) is conducted at the stage when the ready counter reaches the preset calculatory value. At this stage, the mobility management of the wireless communication device MS and the packet switching controller SGSN is set to the idle state, and the packet connections are deactivated. Furthermore, the storage spaces reserved for these in the packet switching controller can be released and used for other purposes, if necessary. The packet connections are also cut off from the gateway GGSN of the GPRS support nodes. The transition from the ready state 302 to the idle state 301 can be conducted also for the reason that a MAP cancel location message is transmitted from the wireless communication device home location register HLR which is advantageously stored in the mobile switching center (MSC) of the packet network, wherein the packet switching controller SGSN deletes the mobility management data for the part of this wireless communication device MS.

The connection state can also change from the standby state 302 to the ready state 303 when there are packet connection packets to be transmitted (arrow 306). The wireless communication device MS transmits, for example, an LLC layer packet to the packet switching controller SGSN. This packet can be, for example, a reply to a location query message. The packet switching controller SGSN shifts from the standby state 302' to the ready state 303' when the packet switching controller SGSN receives the LLC layer packet from the wireless communication device (arrow 306').

The transition from the ready state 303 to the extended ready state 304 according to a preferred embodiment of the invention, is conducted when the ready counter reaches a preset calculatory value (arrow 308, 308').

It is possible to generate the change of the connection state from the ready state 303 to the standby state 302 (arrow 309, 309'), for example with force-to-standby signalling designed for this purpose. Thus, either the wireless communication device MS, or the packet switching controller SGSN reports on the immediate return to the standby state. The wireless communication device MS or the packet switching controller SGSN can signal the return to the standby state 302 before the ready counter reaches the preset calculatory value. Another alternative for this change in the connection state from the ready state 303 to the standby state 302 is an exceptional situation detected in the radio link control RLC. Thus, the packet switching controller SGSN sets the connection state of the mobility management to the standby state 302 in a situation where data transmission problems are detected in the radio interface or where radio transmission is interrupted so that it cannot be restored, but the transmission has to be discontinued.

The connection state can be changed from the extended ready state 304 to the standby state 302 (arrow 310, 310') for various reasons. The connection state can be changed, for instance, in a situation where the extended ready counter reaches the preset calculatory value. Thus, the mobility management state of the wireless communication device MS and the packet switching controller SGSN is restored to the standby state 302. Another possibility is that the wireless communication device MS starts to move, wherein information on this is transmitted to the packet switching controller SGSN, which forces the connection state of the packet switching controller to the standby state 302. The change of the connection state can also be conducted with special signalling, wherein the wireless communication device MS or the packet switching controller SGSN reports on the immediate return into the standby state 302. The wireless communication device MS or the packet switching controller SGSN can report the return into the standby state 302 before the ready counter reaches the preset calculatory value. Still another alternative for the change of connection state from the extended ready state 304 to the standby state 302 is an exceptional situation detected in the radio link control RLC. The connection state of the packet switching controller SGSN is restored to the standby state 302, if data transmission problems are detected in the radio interface, or if radio transmission is interrupted so that it cannot be restored but the transmission has to be discontinued.

The connection state can shift from the extended ready state 304 also to the ready state 303 when there are packet connection packets to be transmitted (arrow 312). The wireless communication device MS transmits, for example, an LLC layer packet to the packet switching controller SGSN. This packet can be, for example, a reply to the location query message. The packet switching controller SGSN transfers from the extended ready state 304' to the ready state 303' at the stage when the packet switching controller SGSN receives the LLC layer packet from the wireless communication device MS (arrow 312').

Yet another possible change of the connection state is when the connection state changes from the ready state 302 to the idle state 301 (arrow 311, 311'). This can be generated when the wireless communication device MS transmits a request for disconnection to the packet network. Thus, the connection state of the packet switching controller SGSN is set to the idle state 301 and the packet connections are deactivated. At the same time, the packet connections of the gateway GGSN of the GPRS support nodes are also cut off. The change of the connection state from the ready state 303 to the idle state 301 can be conducted also in the case that the home location register HLR of the wireless communication device MS transmits a cancel location request to the packet switching controller SGSN, wherein the packet switching controller SGSN releases the space reserved for the mobility management data of the wireless communication device MS in question.

The wireless communication device MS can also be anonymously placed in connection with the packet network, wherein in the mobility management, a limited state model is used which comprises only the idle state 301 and the ready state 303. Thus, the transition from the ready state 303 to the idle state is conducted in the wireless communication device MS and in the packet switching controller SGSN when the ready counter reaches the preset calculatory value. In the packet switching controller SGSN, the connection state can change from the ready state 303 to the idle state 301 also when there are problems detected in the radio link control RLC, as presented earlier in this description.

In this anonymous connection alternative, the transition from the idle state 301 to the ready state is conducted when the wireless communication device MS requests for anonymous attachment to the packet network and a logical link is established to the packet switching controller SGSN. Thus, a space for maintaining the mobility management data is reserved in the wireless communication device MS and in the packet switching controller SGSN. Simultaneously, a space is reserved also for maintaining the packet connection data in the wireless communication device MS, in the packet switching controller SGSN and in the gateway GGSN of the GPRS support nodes.

In the following, the function and implementation of the counters will still be described in more detail. The standby counter is implemented both in the wireless communication device MS and in the packet switching controller SGSN. The standby counter controls the time during which the wireless communication device MS is in the standby state 302, and this counter can be used for monitoring the cut-off of the packet network connection. When the standby counter reaches the preset calculatory value, the mobility management data of the wireless communication device MS and the packet switching controller SGSN, is set to the idle state 301 and the packet connections are deactivated. In the packet switching controller SGSN the mobility management data and packet connection data can be removed.

The calculatory value of the standby counter should be the same both in the wireless communication device MS and in the packet switching controller SGSN. This calculatory value is advantageously preset to a default value, but the packet switching controller SGSN can, if necessary, change the calculatory value of this standby counter by transmitting a new value to the wireless communication device MS, for example in the message indicating the acceptance of the packet connection or in the routing area updating acknowledgement message.

If the calculatory value of the standby counter is preset to zero, the wireless communication device is immediately forced into the idle state 301. If the calculatory value of the standby counter is preset to the maximum, for example, in the GPRS packet network all the bits of the counter are set to logical one state, the standby counter is deactivated, i.e. the standby counter is not used and the wireless communication device remains in the standby state 302 without shifting to the idle state 301. The standby counter is set to its initial value and started always when the connection state is changed to the standby state.

The ready counter is maintained in the wireless communication device MS and in the packet switching controller SGSN. The ready counter controls the time during which the wireless communication device is in the ready state 303. The ready counter is set to its initial value and started in the wireless communication device MS when the LLC layer data packet is transmitted, and correspondingly, in the packet switching controller SGSN, the ready counter is set to its initial value and started when the transmitted LLC layer data packet is as a whole correctly received. When the ready counter reaches the preset calculatory value, both the wireless communication device MS and the packet switching controller SGSN set the mobility management connection state to the ready state 304. If the packet connection is an anonymous connection, the mobility management data is removed.

The calculatory value of the ready counter should be preset to be the same both in the wireless communication device MS and in the packet switching controller SGSN. The initial value of this ready counter can be advantageously set to a default value. This calculatory value of the ready counter can be changed from the packet switching controller SGSN by transmitting a new calculatory value either in connection with said acceptance of connection set-up request, or with an acceptance of routing area updating request.

If the calculatory value of the ready counter is preset to zero, the wireless communication device MS is immediately set to the extended ready state 304. Correspondingly, if the calculatory value of the ready counter is preset to the maximum calculatory value, the ready counter is deactivated in this preferred embodiment, wherein the counter is not used and the wireless communication device MS remains in the ready state 303.

Also the extended ready counter is maintained both in the wireless communication device MS and in the packet switching controller SGSN. The function of this extended ready counter is to control the time during which the wireless communication device MS remains in the extended ready state. The extended ready counter is set to its initial value and started when the ready counter reaches the preset calculatory value. When the extended ready counter reaches the preset calculatory value, the mobility management data in the wireless communication device MS and in the packet switching controller SGSN is restored to the standby state 302. In an anonymous connection, the mobility management data is removed.

The calculatory value of this extended ready counter should also be preset to be the same in the wireless communication device MS and in the packet switching controller SGSN. Also here it is possible to use a definite default value, which can be changed by the packet switching controller SGSN by transmitting a new calculatory value in said acknowledgement messages. If the calculatory value of the extended ready counter is preset to zero, the wireless communication device is immediately set to the standby state 302. Correspondingly, if the calculatory value of the extended ready counter is preset to the maximum calculatory value, the wireless communication device MS remains in the extended ready state 303.

The calculation of the extended ready counter is advantageously based on counting the changes of the cell, or in the CDMA based system on counting the changes of the active set. Thus, after a particular number of changes, the packet connection state is changed as the extended ready counter reaches the preset value, in this case the number of changes. This solution has the advantage, for instance, that when the wireless communication device MS moves rapidly from one cell to another, it is possible to accelerate the change of the state from the extended ready state 304 either to the standby state 302 or to the ready state 303. However, when the wireless communication device is substantially immobile, changes of the cell do not occur either, and the connection state remains in the extended ready state 304. The calculation of the extended ready counter can also be based on measuring time, wherein the extended ready state 304 is changed to the standby state 302 after a set time, unless it is necessary to change the state to the ready state 303, for example in a situation where there are packets of the packet connection to be transmitted (arrow 312).

In practical applications, the counters can be implemented in various ways. One example is that from the memory space of the wireless communication device MS and packet switching controller SGSN, a particular memory address is selected, the content of which is changed for example at intervals, or in connection with particular events. This value of the counter is, for example, subtracted by one, and as the value reaches zero, the calculatory value has passed. This embodiment is presented in the block diagram in FIG. 4 with blocks READY_COUNTER, EXT_RDY_COUNTER, and STANDBY_COUNTER of the storage means MEM of the wireless communication device. This embodiment is also applicable to be used in the packet switching controller SGSN. Another alternative for implementing the counters controlling the change of the connection state of the wireless communication device MS and the packet switching controller SGSN is to use a counter circuit or the like, which can be controlled either with a clock signal or with another change of state, which generates an advantageous change by one in the value of the counter. The counter can be set to its initial value in such a way that a particular calculatory value is set in the register or in the memory address of the counter and the value is subtracted by one at intervals, or when particular events, such as a chance of the cell, are detected. Thus, the preset calculatory time has passed when the value of the counter reaches zero. Control programs for these counters are also composed in the application software of the wireless communication device MS and the packet switching controller SGSN, or a cancel request is set for these counters when the counter reaches the preset calculatory value. The practical implementations of the counters are, on the other hand, prior art known by a man skilled in the art, and it is thus not necessary to discuss them in detail in this context.

Figure 4:
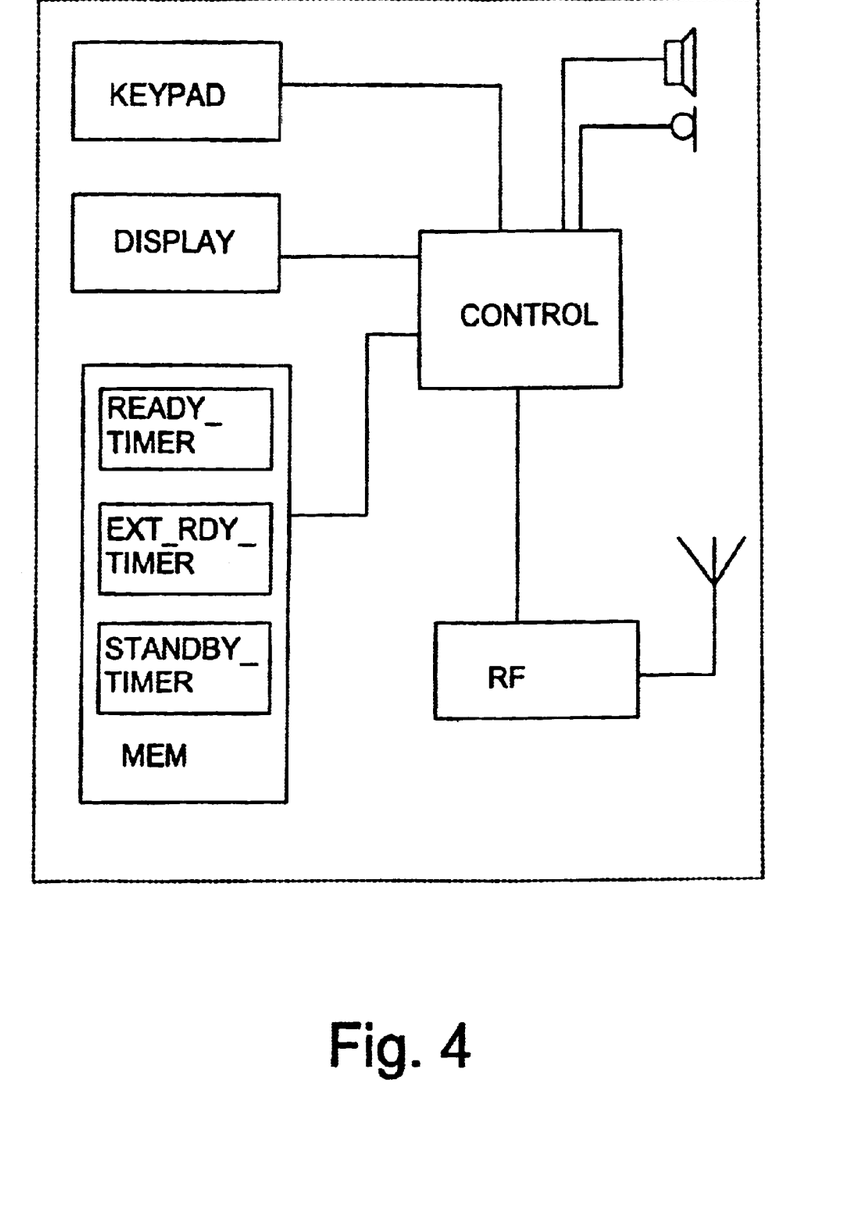
FIG. 4 shows a wireless communication device according to an advantageous embodiment of the invention.

Since the above presented functional features can be primarily implemented in the software of devices and systems of prior art, the block diagram describing a wireless communication device in FIG. 4 primarily only presents a control unit CONTROL, which comprises a micro controlling unit (MCU), or the like, an application-specific integrated circuit (ASIC), memory means MEM, a display unit DISPLAY, a keypad KEYPAD and a radio part RF. The mobility management connection state data and the packet connection data mentioned in the description, can be stored in the memory means MEM and, if necessary, it is possible to use the internal registers of the control unit CONTROL, or the like.

The present invention is not restricted solely to the embodiments presented above, but it can be modified within the scope of the appended claims.

What is claimed is:

1. A method in data transmission between a wireless communication device (MS) and a packet network (PLMN1, PLMN2), in which data transmission between the wireless communication device (MS) and the packet network (PLMN1, PLMN2) is controlled with at least one packet switching controller (SGSN), in which method a group of connection states is determined, from said connection states one at a time is selected, and the selected connection state is set to the wireless communication device (MS) and to the packet switching controller (SGSN), and in which method said connection states are defined to be:
 a ready state (303), in which packets are transmissible in an activated data transmission connection,
 a standby state (302), in which packets to be transmitted or received are waited, and
 an idle state (301), in which the data transmission connection is deactivated,
characterized in that an extended ready state (304) is also determined as a connection state, to which a transition from the ready state (303) is conducted and in which data transmission connection packets to be transmitted or received are waited for.

2. A method according to claim 1, characterized in that the packet network (PLMN1, PLMN2) is divided into cells, from which routing areas are established, and the movement of the wireless communication device is controlled in the area of the packet network (PLMN1, PLMN2), wherein
 in the ready state (303) the packet switching controller (SGSN) is informed of the transition of the wireless communication device (MS) between cells,
 in the standby state (302) the packet switching controller (SGSN) is informed of the transition of the wireless communication device (MS) between routing areas,
 in the idle state (301) the packet switching controller (SGSN) remains uninformed of the transition of the wireless communication device (MS), and
 in the extended ready state (304) the packet switching controller (SGSN) remains uninformed of the transition of the wireless communication device (MS), wherein the location data reported in the ready state (303) is used for defining the location.

3. A method according to claim 1, characterized in that the duration of the ready state (303) is measured with a ready counter (RDY_counter), to which a calculatory value is set in connection with the packet transmission, wherein the transition to the extended ready state (304) is conducted after the calculatory value preset in said ready counter (RDY_counter) is reached.

4. A method according to claim 1, characterized in that the packet network (PLMN1, PLMN2) is divided into cells, from which routing areas are established, wherein the location of the wireless communication device (MS) is defined in the method.

5. A method according to claim 1, characterized in that in the ready state (303) the location is defined with the accuracy of one cell, in the extended ready state (304) the location defined in the ready state (303) is used for defining the location, in the standby state (302) the location is defined with the accuracy of the routing area, and in the idle state (301) the location remains undefined.

6. A method according to claim 1, characterized in that the duration of the extended ready state (304) is measured with an extended ready counter (EXT_RDY_counter), to which a calculatory value is set in connection with the transition to the extended ready state (304), wherein the extended ready state (304) is interrupted after the calculatory value preset in the extended ready counter (EXT_RDY_counter) is reached.

7. A method according to claim 6, characterized in that with the extended ready (304) counter (EXT_RDY_counter) the change of the location of the wireless communication device (MS) between cells is calculated.

8. A method according to claim 6, characterized in that a packet network (PLMN1, PLMN2) according to CDMA system is used in the method, in which the base stations of the packet network (PLMN1, PLMN2) which at a given time are in data transmission connection with the wireless communication device (MS), constitute an active set, wherein with the extended ready (304) counter (EXT_RDY_counter) the change of location of the wireless communication device (MS) is calculated on the basis of the changes of the active sets.

9. A method according to claim 6, characterized in that the extended ready (304) counter (EXT_RDY_counter) is used to measure time.

10. A method according to claim 1, characterized in that in connection with an interruption in the extended ready state (304), the connection state is changed to the ready state (303) when there are packets to be transferred, or in other cases, to the standby state (302).

11. A system, which comprises:
 a packet network (PLMN1, PLMN2),
 at least one wireless communication device (MS) which is in data transmission connection with the packet network (PLMN1, PLMN2),
 means (Um, BSS, SGSN) for activating and deactivating a packet format data transmission connection between the wireless communication device (MS) and the packet network (PLMN1, PLMN2), a packet switching controller (SGSN) for controlling data transmission between the wireless communication device (MS) and the packet network (PLMN1, PLMN2), and means (MEM, SGSN) for setting a connection state in the wireless communication device (MS) and in the packet switching controller (SGSN) to a ready state (303), for transferring packets in an activated data transmission connection; to a standby state (302), for waiting for data transmission connection packets to be transmitted or received; or to an idle state (301), when the data transmission connection is deactivated, characterized in that the means (MEM, SGSN) for setting the connection state also comprise means (CONTROL, RDY_counter) for setting the connection state to an extended ready state (304).

12. A system according to claim 11, characterized in that the transition to the extended ready state (304) is arranged to be conducted from the ready state (303), and in which extended ready state (304) the wireless communication device (MS) and the packet switching controller (SGSN) are arranged to wait for data transmission connection packets to be transmitted and received.

13. A system according to claim 11, characterized in that the means for setting the connection state to the extended ready state (304) comprise a ready counter (RDY_counter), means (CONTROL) for setting a calculatory value in said counter (RDY_counter) in connection with the packet transmission, wherein the transition to the extended ready state (304) is arranged to be conducted after the preset calculatory value in the ready counter (RDY_counter) is reached.

14. A system according to claim 11, characterized in that the packet network (PLMN1, PLMN2) is divided into cells, from which routing areas are composed, wherein the system comprises means for defining the location of the wireless communication device (MS).

15. A system according to claim 14, characterized in that in the ready state (303) the location is arranged to be defined with the accuracy of one cell, in the extended ready state (304) the location defined in the ready state (303) is arranged to be used for defining the location, in the ready state (302) the location is arranged to be defined with the accuracy of the routing area, and in the idle state (301) the location definition is switched off.

16. A system according to claim 11, characterized in that the means (MEM, SGSN) for setting the connection state also comprise means (CONTROL, EXT_RDY_counter) for interrupting the extended ready state (304).

17. A system according to claim 16, characterized in that the means (CONTROL, EXT_RDY_counter) for interrupting the extended ready state (304) include a counter (EXT_RDY_counter), wherein the extended ready state (304) is interrupted when the value preset in the counter is reached.

18. A system according to claim 17, characterized in that the counter is arranged to count the change of location of the wireless communication device (MS) between cells.

19. A system according to claim 17, characterized in that the packet network (PLMN1, PLMN2) is a packet network according to CDMA system, in which the cells of the packet network (PLMN1, PLMN2), which at a given time are in data transmission connection with the wireless communication device (MS), compose an active set, wherein the counter is arranged to count the change of location of the wireless communication device (MS) on the basis of the changes of active sets.

20. A system according to claim 17, characterized in that the packet network (PLMN1, PLMN2) is a packet network according to CDMA system, in which the cells of the packet network (PLMN1, PLMN2), which at a given time are in data transmission connection with the wireless communication device (MS), compose an active set, wherein the counter is arranged to count changes of active set.

21. A system according to claim 17, characterized in that the counter is arranged to measure time.

22. A system according to claim 11, characterized in that in connection with the interruption of the extended ready state (304) the connection state is arranged to be changed to the ready state (303) when there are packets to transmit, or in other cases, to the standby state (302).

23. A wireless communication device (MS) comprising means (Um) for data transmission in packet format between the wireless communication device (MS) and a packet network (PLMN1, PLMN2), the packet network (PLMN1, PLMN2) which comprises:

means (Um, BSS, SGSN) for activating and deactivating packet format data transmission connection, a packet switching controller (SGSN) for controlling data transmission between the wireless communication device (MS) and the packet network (PLMN1, PLMN2), and means (MEM, SGSN) for setting a connection state in the wireless communication device (MS) and in the packet switching controller (SGSN) to a ready state (303), for transferring packets in an activated data transmission connection; to a standby state (302), for waiting for data transmission connection packets to be transmitted or received; or to the idle state (301), when the data transmission connection is deactivated, characterized in that the wireless communication device (MS) also comprises means (CONTROL, RDY_counter) for setting the connection state of the wireless communication device (MS) to an extended ready state (304).

* * * * *